United States Patent [19]
Leboutet et al.

[11] Patent Number: 5,263,035
[45] Date of Patent: Nov. 16, 1993

[54] METHOD AND DEVICE FOR THE ADJUSTMENT OF THE TRANSVERSE MAGNETIC FIELD IN AN UNDULATOR FOR THE GENERATION OF LIGHT ENERGY FROM AN ELECTRON BEAM

[75] Inventors: Hubert Leboutet, Saint Cloud; Michel Simon, Elancourt, both of France

[73] Assignee: Thomson-CSF, Puteaux, France

[21] Appl. No.: 869,962

[22] Filed: Apr. 17, 1992

[30] Foreign Application Priority Data

Apr. 25, 1991 [FR] France .................... 91 05109

[51] Int. Cl.⁵ .............................. H01S 3/00
[52] U.S. Cl. .............................. 372/2; 372/37
[58] Field of Search .................... 372/2, 37

[56] References Cited
U.S. PATENT DOCUMENTS 3,822,410  7/1974  Madey .
4,542,510  9/1985  Black, Jr. .
5,020,061  5/1991  Etievant et al. .................... 372/2

Primary Examiner—Leon Scott, Jr.
Attorney, Agent, or Firm—Pollock, Vande Sande & Priddy

[57] ABSTRACT

The disclosure relates to an undulator, namely a device generating a transverse magnetic field polarized alternatively North-South and South-North along the path of an electron beam and enabling the direct conversion, in a free electron laser, of a part of the energy of a beam of relativistic electrons into light energy. The undulator comprises a conductor forming, along the path of the electron beam, undulations that wholly or partially induce the transverse magnetic field. To increase the light efficiency, it consists in providing for auxiliary current bypass connectors on said conductor. These auxiliary connectors enable the modulation of the transverse magnetic field as a function of the changing characteristics of the high frequency electrical field which increases during the arrival of a packet of electrons in the optical cavity of the laser owing to the energy yielded by these electrons.

7 Claims, 6 Drawing Sheets

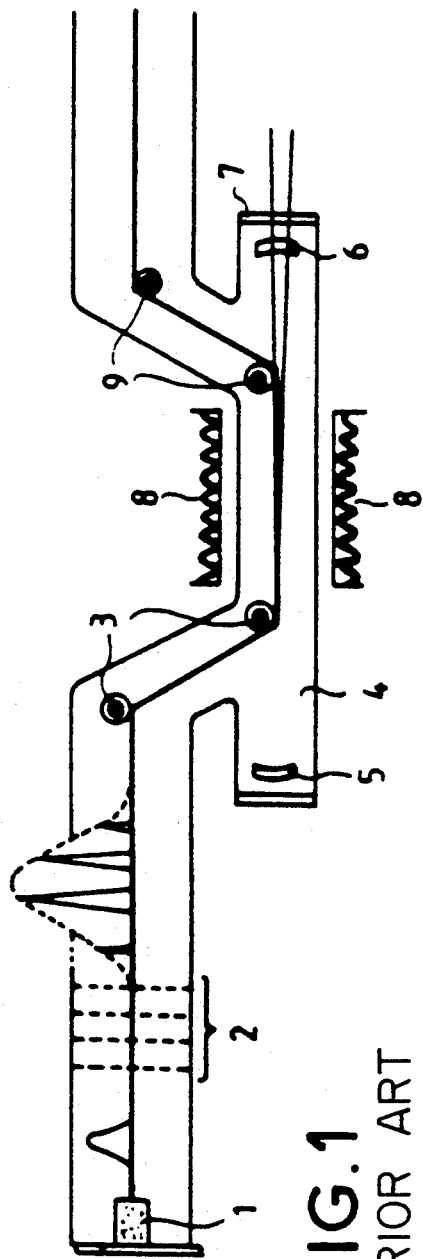
FIG.1
PRIOR ART
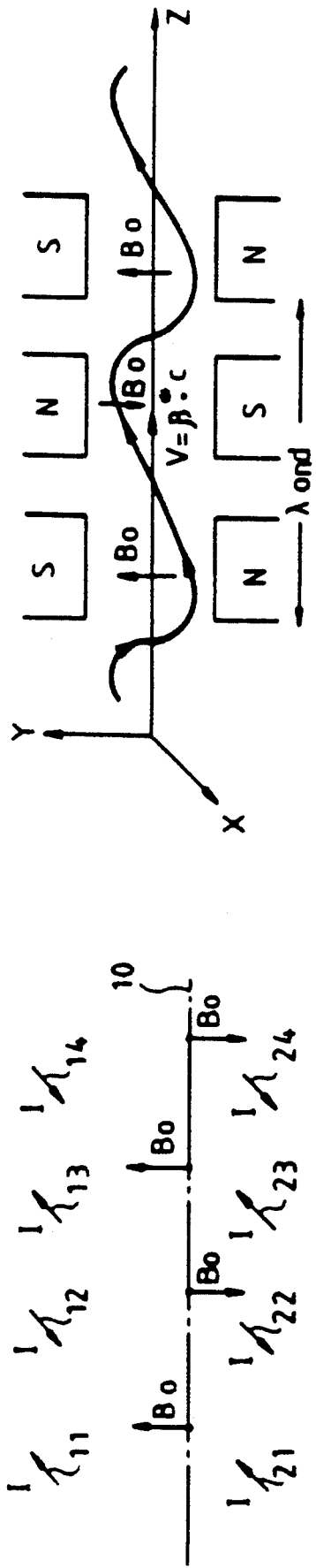
FIG.2
FIG.3

METHOD AND DEVICE FOR THE ADJUSTMENT OF THE TRANSVERSE MAGNETIC FIELD IN AN UNDULATOR FOR THE GENERATION OF LIGHT ENERGY FROM AN ELECTRON BEAM

BACKGROUND OF THE INVENTION

1. Field of the Invention

The invention relates to devices known as undulators which, in free electron lasers (FELs), enable the direct conversion of a part of the energy of a beam of relativistic electrons into light energy.

2. Description of the Prior Art

A free electron laser is constituted, as shown in FIG. 1, by:

a high energy electron source which is formed by an electron gun 1 followed by an induction or r.f. linear accelerator 2 which emits bursts of accelerated electrons bunched in packets of several thousands, one burst having the duration of a micropulse of several tens of picoseconds and one packet having the duration of a macropulse of several tens of microseconds;

a first magnetic deflection system 3 enabling the path of the accelerated electrons to be deflected towards a tuned laser optical cavity 4;

said tuned laser optical cavity 4 with its mirrors 5 and 6, and its optical window 7 for the output of the light waves;

an undulator 8 which is positioned in the median part of the optical cavity 4 on the path of the beam of accelerated electrons and generates a transverse magnetic field that is alternately polarized North-South/South-North along the direction of propagation of the electron beam, and a second system of magnetic deflection 9 enabling the path of the electron beam to be deflected after it has passed into the optical cavity 4 so that it escapes laterally therefrom with respect to the optical window 7 for the output of the light waves.

The principle of operation of the free electron laser is based on the decelerating radiation that results from the fact that any electron undergoing acceleration or deceleration radiates electromagnetic energy and on the relativistic shortening of the wavelength.

In the undulator, the electrons crossing an alternatively polarized transverse magnetic field undergo, as shown in FIG. 2, deflections of small amplitudes, sometimes in one direction and sometimes in the other, and radiate light energy in the direction in which the the beam is propagated. In conditions close to synchronism between the forced oscillation of electrons and the light wave, there is a transfer of energy from the electrons to the light wave and the triggering of a laser phenomenon in the optical cavity.

The wavelength of the light emission may be written as follows:

$$\lambda = \frac{\lambda\, \text{wave}}{2\gamma^2}\left(1 + \frac{K^2}{2}\right)$$

$\lambda$wave is the magnetic pitch or the pitch of the undulator $\tau$ is equal to:

$$\gamma = \frac{1}{\sqrt{1 - \left(\frac{v}{c}\right)^2}}$$

v being the velocity of the electrons and c the velocity of light;

K is equal to:

$$K = 0.94\, \lambda\, \text{wave}\, B_o.$$

$B_o$ being the value of the magnetic induction produced by the undulator.

It is observed that the wavelength of the light emission is all the shorter as the magnetic pitch wave of the undulator is small.

Undulators using this principle of physics have already been used in many devices.

They use magnetic circuits that are constituted either by a structure with permanent, electromagnetic or hybrid magnets or a structure without any magnet with an electrical conductor that decribes undulations on the path of the electron beam and is crossed by a strong excitation current.

SUMMARY OF THE INVENTION

The present invention relates, more particularly, to undulators, the transverse magnetic field of which is generated, wholly or in part, by an excitation current. This current flows in a conductor that forms undulations along the path of the electron beam in the optical cavity of a free electron laser.

It is aimed at improving the interaction between electrons and light energy radiated within the undulator.

An object of the invention is a method for the adjusting of the transverse magnetic field in an undulator for the generation of light energy from an electron beam emitted in isolated packets, one packet having the duration of a macropulse, the undulator comprising a conductor forming, along the path of the electron beam, undulations that entirely or partially induce a transverse magnetic field that is polarized alternately North-South and South-North. This method consists in:

providing for auxiliary current bypass connectors on the conductor inducing the transverse magnetic field, said auxiliary current bypass connectors being distributed along the path of the electron beam in the undulator, injecting a main excitation current in the entire conductor inducing the transverse magnetic field for the duration of a macropulse corresponding to the period of time during which a packet of electrons passes through the undulator, and injecting, through the auxiliary bypass connectors at the start of each macropulse, partial auxiliary currents that get added to the main excitation current in parts of the conductor that induce a transverse magnetic field in zones of the path of the electron beam in the undulator that are located upline from said auxiliary connectors with respect to the direction of flow of the beam.

Preferably, the partial auxiliary currents injected by the auxiliary connectors have intensities that are constant over a duration of one to two microseconds and then diminish until they get cancelled out in one or two microseconds.

Another object of the invention is an undulator for the implementation of the above-mentioned method.

BRIEF DESCRIPTION OF THE DRAWINGS

Other features and advantages of the invention shall emerge hereinafter from various embodiments given by way of an example. This description shall be made with reference to the drawing, wherein:

FIG. 1, mentioned here above, represents a schematic drawing showing the principle of a free electron laser;

FIG. 2, mentioned here above, illustrates the path undulations brought about in an electron beam by an alternately North-South and South-North polarized transverse magnetic field;

FIG. 3 shows a very schematic view of a way of generating, along an axis, an alternately North-South and South-North polarized transverse magnetic field by means of a superimposition of two identical sheets of transverse excitation currents in alternating directions;

In the different figures, the same references have been repeated for the same elements.

MORE DETAILED DESCRIPTION

Figure 4A:
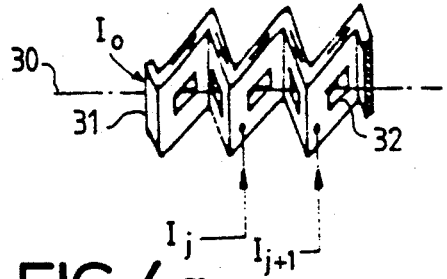
FIGS. 4a, 4b, 4c, 4d, 4e, 4f, 4g, and 4h give a view, in perspective, of different possible forms for an undulating conductor constituting a magnetization circuit of an undulator.
Figure 4B:
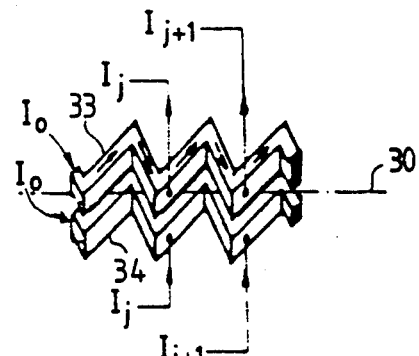
Figure 4C:
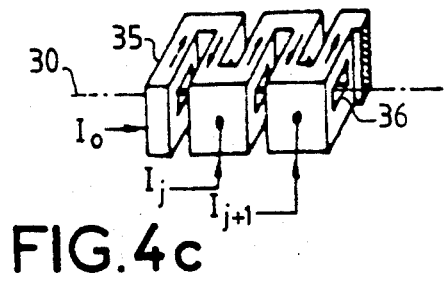

As can be seen in FIG. 3, an alternatively North-South and South-North polarized transverse magnetic field can be obtained along a direction 10 representing the path of an electron beam by positioning, above and below this direction, two identical layers of currents 11, 12, 13, 14 and 21, 22, 23, 24 positioned transversely in alternating directions. These two layers of currents may be obtained by means of an electrical conductor describing undulations on either side of the path of the electron beam in the optical cavity. This electrical conductor, which then constitutes the magnetization circuit of the undulator, may assume different shapes. It may then be formed by a single part as shown in 31, 35, 39, 43 in FIGS. 4a, 4c, 4e and 4g. It is then pierced longitudinally with holes 32, 36, 40, 44 aligned on the axis 30 of the path of the electron beam. It may also be made of two parts having the same shape, superimposed, with an interposed space in which there passes the electron beam travelling in transit through the optical cavity as shown by double parts 33, 34; 37, 38; 41, 42; 45, 46 in FIGS. 4b, 4d, 4f and 4h. It describes undulations that may have either triangular contours as shown in 31, 33, 34 in FIGS. 4a and 4b or rectangular U shaped contours as shown in 35, 37, 38 in FIGS. 4c and 4d or $\pi$ shaped contours as shown in 39, 41, 42 in FIGS. 4e and 4f or rounded contours as shown in 43, 45, 46 in FIGS. 4g and 4h.

When the electrical conductor of the magnetization circuit of the undulator is made of two superimposed parts, one positioned above and the other beneath the path of the electron beam in the optical cavity, the electrical links between these two parts are organized so as to make the same excitation current flow in the same direction in each of them.

Figure 5:
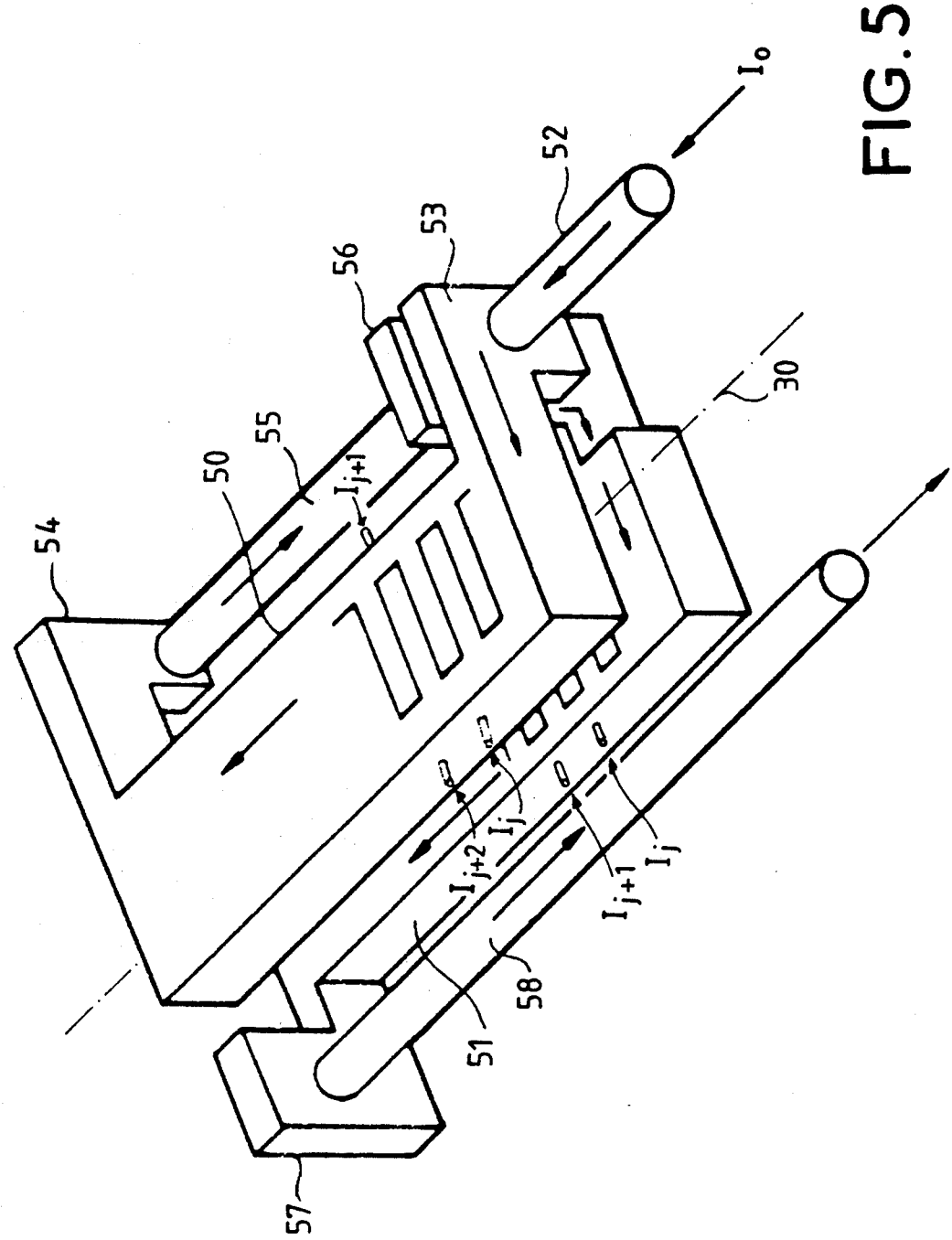
FIG. 5 shows a schematic view, in perspective, of the electrical assembly of an undulating electrical conductor in two superimposed parts, one positioned above and the other positioned below the path of the electron beam in the optical cavity of the laser.

An example thereof is given in FIG. 5 which shows the two parts 50, 51, shown schematically, of an undulating magnetization circuit conductor. The lead-in of the excitation current is done by a conductive bar 52 fixed to a conductive lateral shoulder, 53 forming a first end of the part 50 of the undulating conductor positioned above axis 30 of the electron beam. The excitation current crosses this part 50 and emerges therefrom by its second end which forms a second lateral shoulder 54 positioned on the same side. This lateral shoulder 54 is fixed to a conductive interconnection bar 55 between the two parts 50 and 51 of the undulating conductor which returns towards the first end of the part 50 and, before the lateral part 53 of this shoulder, meets another lateral shoulder 56 forming a first end of the part 51 of the undulating conductor positioned below axis 30 of the electron beam. The excitation current returns through the conductive interconnection bar 55 towards the first end of the part 51 of the undulating conductor then crosses this part 51 in the same direction as the part 50 and emerges therefrom by a second end which forms a conductive lateral part 57 that extends beyond the side opposite the other lateral shoulders 53, 54, 56 and is connected to a current lead-out conductive bar 58 extending along the two parts 50 and 51 of the undulating conductor.

In the electron beam that crosses the undulator in the optical cavity of the free electron laser, the electrons that come from an r.f. linear accelerator get propagated in bursts that correspond to micropulses of several tens of picoseconds and are bunched together in several thousands in isolated packets corresponding to periods ranging from some tens of microseconds to a few seconds.

To set off a laser phenomenon, it is necessary to set up a transverse magnetic field in the undulator at the passage of each packet of electron bursts. This can be done by providing the magnetic circuit of the undulator with a pulse current of several tens of kiloamperes, maintained for a period slightly greater than that of a macropulse. However, the working of the interaction between the electrons and the light energy radiated within the undulator placed in the optical cavity of the laser ca be improved by causing a variation in the value of the transverse magnetic field of the undulator during a macropulse as a function of both time and position along the path of the electron beam in the optical cavity so that, during the build-up of power of the interaction between electrons and radiated light energy, following the arrival of a packet of bursts of electrons in the undulator, the law of variation of synchronous speed along the undulator is, at each instant, the optimal law corresponding to the instantaneous level of the high frequency electrical field. Indeed, to optimize the efficiency of the interaction between electrons and radiated light energy, it is necessary to modulate the transverse magnetic field in the undulator as a function of the changing characteristics of the high frequency electrical field which increases as and when a macropulse progresses owing to the energy given to the optical cavity by each burst of electrons.

To enable the adjustment of the value of the transverse magnetic field as a function of both the time and the position along the path of the electron beam in the undulator the undulating conductor generating the transverse magnetic field will be provided, as shown in FIGS. 4a, 4b, 4c, 4d, 4e, 4f, 4g and 5, with auxiliary bypass connectors that are distributed along the path of the electron beam in the undulator and are referenced in ascending order j, j+1, in reverse to the direction of movement of the beam.

In practice, auxiliary currents $I_j$, $I_{j+1}$ are injected by the auxiliary bypass connectors for a period of less than one or two microseconds at the start of each macropulse. These auxiliary currents $I_j$, $I_{j+1}$ get added to the main current $I_o$ in those parts of the conductor inducing the transverse magnetic field that are located, in relation to these connectors, upline with respect to the direction of movement of the electrons of the beam. Then, these auxiliary currents are made to diminish until they are cancelled for a subsequent period also smaller than one or two microseconds while, at the same time, the intensity of the main excitation current is kept constant throughout the duration of a macropulse. The initial intensities of the auxiliary currents $I_j$ and $I_{j+1}$ as well as their laws of diminishing or decay during each macropulse are adjusted experimentally so as to optimize the efficiency in light energy.

Figure 6:
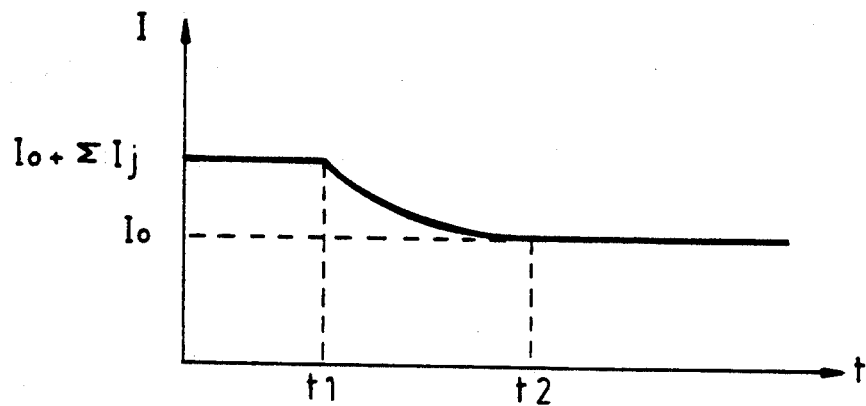
FIG. 6 shows the form of the law of variation as a function of the time of the excitation current of an undulator magnetization circuit according to the invention.

The law of variation, as a function of time, of the excitation current at a point upline from the auxiliary bypass connectors on the conductor that induces the transverse magnetic field of the undulator is shown in FIG. 6. A current with a maximum value $I_o + \Sigma I_j$ ($\Sigma I_j$ being the sum of the partial currents injected by the auxiliary bypass connectors placed downline from the point considered) flows during a period $t_1$ smaller than one or two microseconds at the start of a macropulse corresponding to the arrival in the undulator of a packet of electron bursts. The current flowing then follows a law of decay for a period $t_2 - t_1$ smaller than one or two microseconds, and then remains constant at the value $I_o$ up to the end of the macropulse.

Figure 7:
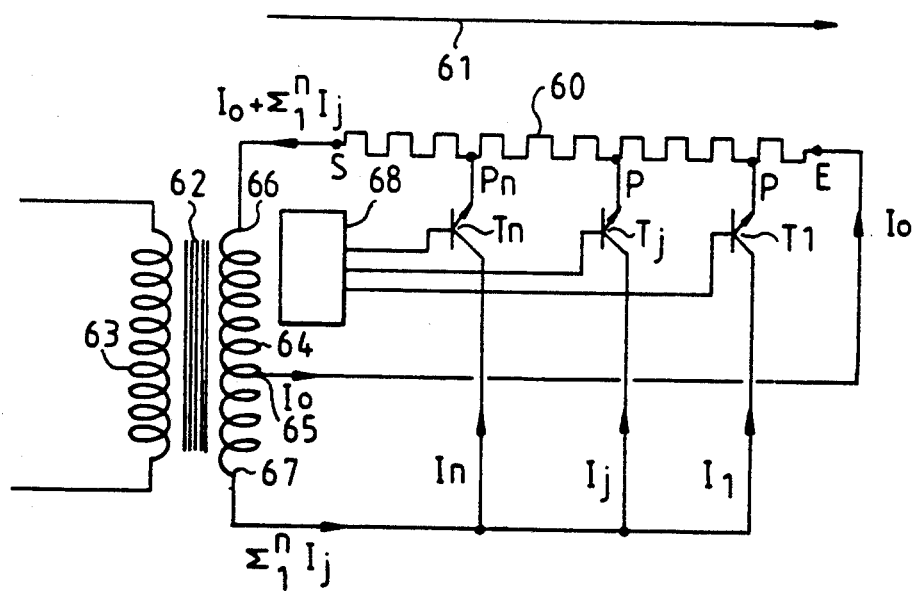
FIG. 7 shows a diagram of an electrical excitation circuit of an undulator having a magnetization circuit constituted by an undulating conductor in only one part.

FIG. 7 gives an example of an electrical circuit for supplying current to an undulator having a magnetization circuit constituted by an undulating conductor 60 formed by only one part, such as those shown in FIGS. 4a, 4c, 4e or 4g. The electron beam flows along the undulating conductor 60 within a series of holes pierced longitudinally from the end S to the end E along the direction of the arrow 61. The undulating conductor 60 is provided with auxiliary current bypass connectors $P_1 \ldots, P_j \ldots, P_n$ spaced out along its length and supplied with current by means of a pulse transformer 62. The pulse transformer 62 comprises a primary winding 63 and a secondary winding 64 with intermediate connector 65. The undulating conductor 60 is connected by its end S to an end terminal 66 of the secondary winding 64 and by its end E to the intermediate connector 65. The other end terminal 67 of the secondary winding 64 of the pulse transformer 62 is connected by means of the collector-emitter junctions of current switching transistors $T_1 \ldots, T_j \ldots, T_n$ to the auxiliary current bypass connectors $P_1 \ldots, P_j \ldots, P_n$ of the undulating conductor 60. The bases of the current switching transistors $T_1 \ldots, T_j \ldots, T_n$ are connected to a control circuit 68.

During operation, the pulse transformer 62 receives excitation pulses at its primary winding 63. Each of these excitation pulses, with a slightly greater duration, overlaps a macropulse coinciding with the arrival, in the undulator, of a packet of electron bursts. Each excitation pulse prompts the appearance of a main current $I_o$ at the intermediate connector 65 of the secondary winding 64 of the pulse transformer 62. This main current $I_o$ has an intensity ranging from some kiloamperes to some tens of kiloamperes and flows throughout the length of the undulating conductor. Furthermore, during a period of time $t_1$ smaller than one or two microseconds when the current switching transistors $T_1 \ldots, T_j \ldots, T_n$ are made conductive by the control circuit 68, each of said excitation pulses prompts the appearance of partial auxiliary currents $I_1 \ldots, I_j \ldots, I_n$ on the end terminal 67 of the secondary winding 64 which are injected into the undulating conductor 60 at each of its different auxiliary bypass connectors $P_1 \ldots, P_j \ldots, P_n$ and which emerge through the end S of this conductor located upline in relation to the direction of movement of the electron beam (direction of the arrow 61). At the end of the period $t_1$, the current switching transistors $T_1 \ldots, T_j \ldots, T_n$ are gradually turned off by the control circuit 68 for a period $t_2 - t_1$ smaller than one or two microseconds in order to eliminate the partial auxiliary currents and obtain a law of variation of current having a form similar to the one shown in FIG. 6.

Figure 8:
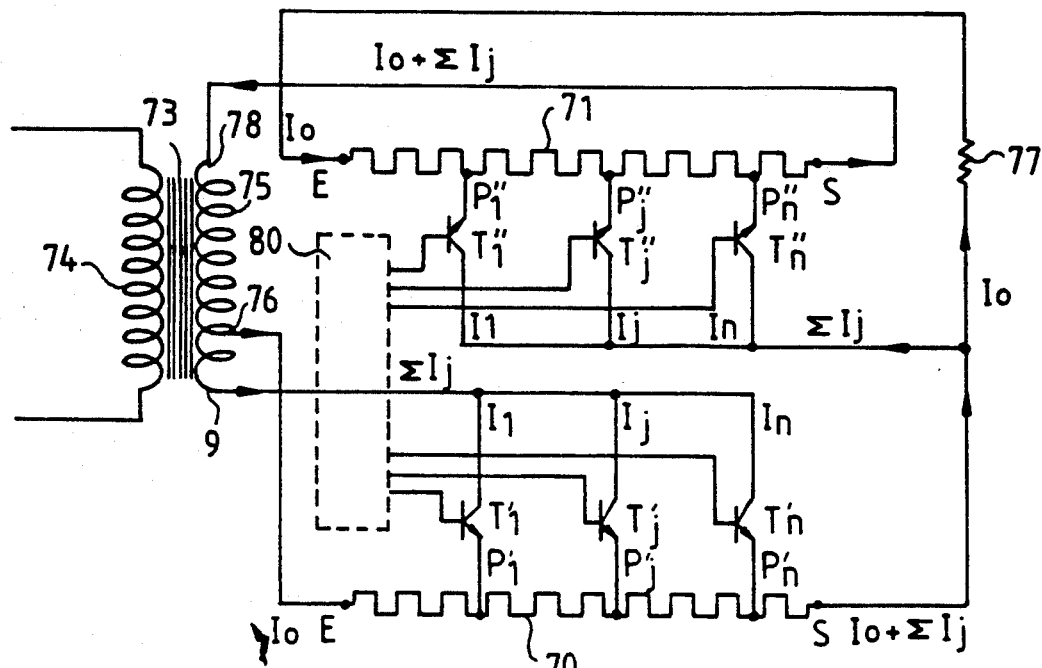
FIGS. 8 and 9 show diagrams of electrical excitation circuits of an undulator having a magnetization circuit constituted by an undulating conductor in two superimposed parts.

FIG. 8 shows an example of an electrical circuit for the supply of current to an undulator having a magnetization circuit constituted by an undulating conductor in two parts 70, 71 such as those shown in FIGS. 4b, 4d, 4f or 4h. The electron beam flows along the undulating conductor between its two parts 70, 71 from their end S up to their end E along the direction of the arrow 72. The two parts 70, 71 of the undulating conductor are provided with auxiliary current bypass connectors $P'_1 \ldots, P'_j \ldots, P'_n$ and $P''_1 \ldots, P''_j \ldots, P''_n$ respectively, spaced out along their length. They are supplied with current by a pulse transformer 73 with a primary winding 74 and a secondary winding 75 with intermediate connector 76. The part 70 of the undulating conductor is connected by its end E to the intermediate connector 76 and by its end S to a resistor 77 leading to the end E of the other part 71, the end S of which is connected to an end terminal 78 of the secondary winding of the pulse transformer 73. The other end terminal 79 of the secondary winding 75 of the pulse transformer 73 is connected by means of the collector-emitter junctions of a group of current switching transistors $T'_1 \ldots, T'_j \ldots, T'_n$ to the auxiliary bypass connectors $P'_1 \ldots, P'_j \ldots, P'_n$ of the part 70 of the undulating conductor while the auxiliary bypass connectors $P''_1 \ldots, P''_j \ldots, P''_n$ of the other part 71 of the undulating conductor are connected by means of the collector-emitter junctions of another group of current switching transistors $T''_1 \ldots, T''_j \ldots, T''_n$ to the end S of the first part 70 of the undulating conductor. The bases of the current switching transistors $T'_1 \ldots, T'_j \ldots, T'_n$ and $T''_1 \ldots, T''_j \ldots, T''_n$ of the two groups are connected to a control circuit 80.

During operation, the pulse transformer 73 receives excitation pulses at its primary winding 74. Each of these excitation pulses, with a slightly greater duration, overlaps a macropulse coinciding with the arrival, in the undulator, of a packet of electron bursts. Each excitation pulse prompts the appearance of a main current $I_o$ at the intermediate connector 76 of the secondary winding 75 of the pulse transformer 73. This main current $I_o$ has an intensity ranging from some kiloamperes to some tens of kiloamperes and flows throughout the length of the two parts 70, 71 of the undulating conductor in the same direction in each of the two parts with respect to the path travelled by the electron beam. Furthermore, during a period of time $t_1$ smaller than one or two microseconds when the two groups of current switching transistors $T'_1 \ldots, T'_j \ldots, T'_n$ and $T''_1 \ldots, T''_j \ldots, T''_n$ are made conductive by the control circuit 80, each of said excitation pulses prompts the appearance of partial auxiliary currents $I_1 \ldots, I_j \ldots, I_n$ which are, firstly, taken at the end terminal 79 of the secondary winding 75 and injected into the part 70 of the undulating conductor at the different auxiliary bypass connectors $P'_1 \ldots, P'_j \ldots, P'_n$ and which are, secondly, taken at output of the part 70 of the undulating conductor to be injected into the other part 71 of the undulating conductor at the different auxiliary bypass connectors $P''_1 \ldots, P''_j \ldots, P''_n$. The resistor 77 placed at the head of the part 71 of the undulating conductor compensates for the resistance, in the ON state, of the transistors $T''_1 \ldots, T''_j \ldots, T''_n$ to enable the extraction of the partial currents $I_1, I_j, I_n$ at output of the part 70 of the undulating conductor. Thus, the two parts 70, 71 of the undulating conductor are crossed by identical currents that increase in the shift from their end E to their end S in a reverse direction of arrow to the direction 72 of the path travelled by the electron beam. At the end of the period $t_1$, the two groups of current switching transistors $T'_1 \ldots, T'_j \ldots, T'_n$ and $T''_1 \ldots, T''_j \ldots, T''_n$ are gradually turned off for a period $t_2 - t_1$ smaller than one or two microseconds in order to eliminate the partial auxiliary currents and obtain a law of variation of current having a form similar to the one shown in FIG. 6.

Figure 9:
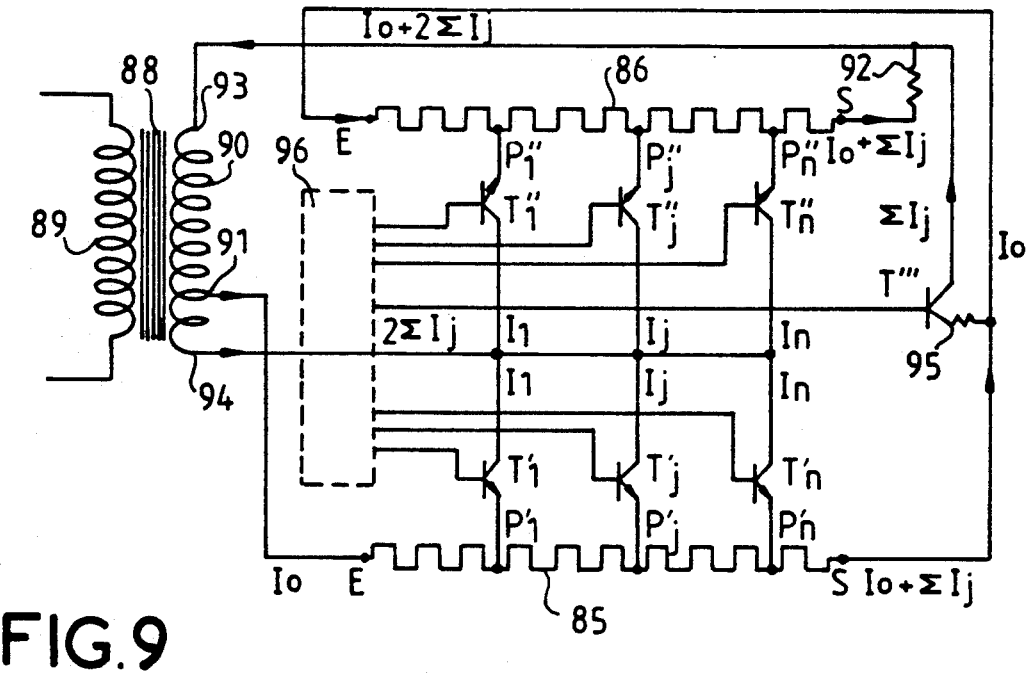

FIG. 9 shows another example of an electrical circuit for the supply of current to an undulator having a magnetization circuit constituted by an undulating conductor in two parts 85, 86. The electron beam flows along the undulating conductor, between its two parts 85, 86 from their end S up to their end E along the direction arrow 87. The two parts 85, 86 of the undulating conductor are provided, as above, with auxiliary current bypass connectors $P'_1 \ldots, P'_j \ldots, P'_n$ and $P''_1 \ldots, P''_j \ldots, P''_n$ respectively, spaced out along their length. They are supplied with current by a pulse transformer 88 comprising a primary winding 89 and a secondary winding 90 with intermediate connector 91. The part 85 of the undulating conductor has its end E connected to the intermediate connector 91 and its end S connected to the end E of the other part 86, the other end S of which is connected by means of a resistor 92 to an end terminal 93 of the secondary winding 90 of the pulse transformer 88. The other end terminal 94 of the secondary winding 90 of the pulse transformer 88 is connected by means of the collector-emitter junctions of two groups of current switching transistors $T'_1 \ldots, T'_j \ldots, T'_n$ and $T''_1 \ldots, T''_j \ldots, T''_n$ to the auxiliary bypass connectors $P'_1 \ldots, P'_j \ldots, P'_n$ and $P''_1 \ldots, P''_j \ldots, P''_n$ of both of the parts 85, 86 of the undulating conductor. A current switching transistor $T'''$ has its collector-emitter junction connected in series with a resistor 95 between the end S of the part 85 of the undulating conductor and the end terminal 93 of the secondary winding 90 of the pulse transformer 88. The bases of the current switching transistors $T'_1 \ldots, T'_j \ldots, T'_n$ and $T''_1 \ldots, T''_j \ldots, T''_n$ of the two groups as well as that of the transistors $T'''$ are connected to a control circuit 96.

As in the above two examples, the pulse transformer 88 receives excitation pulses at its primary winding 89. Each of these excitation pulses, with a slightly greater duration, overlaps a macropulse coinciding with the arrival, in the undulator, of a packet of electron bursts. Each excitation pulse prompts the appearance of a main current $I_o$ at the intermediate connector 91 of the secondary winding 90 of the pulse transformer 88. This main current $I_o$ has an intensity ranging from some kiloamperes to some tens of kiloamperes and flows throughout the length of the two parts 85, 86 of the undulating conductor in the same direction in each of the two parts with respect to the path travelled by the electron beam. Furthermore, during a period of time $t_1$ smaller than one or two microseconds when all the current switching transistors $T_1 \ldots, T_j \ldots, T_n$ and $T'''_1 \ldots, T'''_j \ldots, T'''_n$ and $T'''$ are made conductive by the control circuit 96, each of said excitation pulses prompts the appearance of partial auxiliary currents $I_1 \ldots, I_j \ldots, I_n$ taken at the end terminal 94 of the secondary winding 90. They are, firstly, injected into the part 85 of the undulating conductor at the different auxiliary bypass connectors $P'_1 \ldots, P'_j \ldots, P'_n$ and extracted at output of the end S by the transistor $T'' \propto$ and, secondly, injected into the part 86 of the undulating conductor at the different auxiliary bypass connectors $P''_1 \ldots, P''_j \ldots, P''_n$. The resistor 92 placed at the end S of the part 86 of the undulating conductor compensates for the resistance, in the ON state, of the transistors $T'''$ providing for the extraction of the partial currents $I_1, I_j, I_n$ at output of the part 85 of the undulating conductor so that only the main current $I_o$ penetrates by the end E of the other part 86 of the undulating conductor so that the two parts 85 and 86 are crossed by identical currents. The resistor 95 enables the intensity of the current extracted between the two parts 85, 86 of the undulating conductor to be adjusted by the transistor $T'''$ so that this intensity truly corresponds to the intensities of the partial currents. Thus, during the period $t_1$, the two parts 85, 86 of the undulating conductor are crossed by identical currents, the intensity of which increases with the shift from their end E to their end S in a reverse direction to the arrow of direction 87 of the path travelled by the electron beam. At the end of the period $t_1$, the two groups of current switching transistors $T'_1 \ldots, T'_j \ldots, T'_n$ and $T'''_1 \ldots, T'''_j \ldots, T'''_n$ and the transistor $T'''$ are gradually turned off for a period $t_2 - t_1$ smaller than one or two microseconds in order to eliminate the partial auxiliary currents and obtain, in the two parts 85, 86 of the undulating conductor, a law of variation of current having a form similar to the one shown in FIG. 6.

Figure 11:
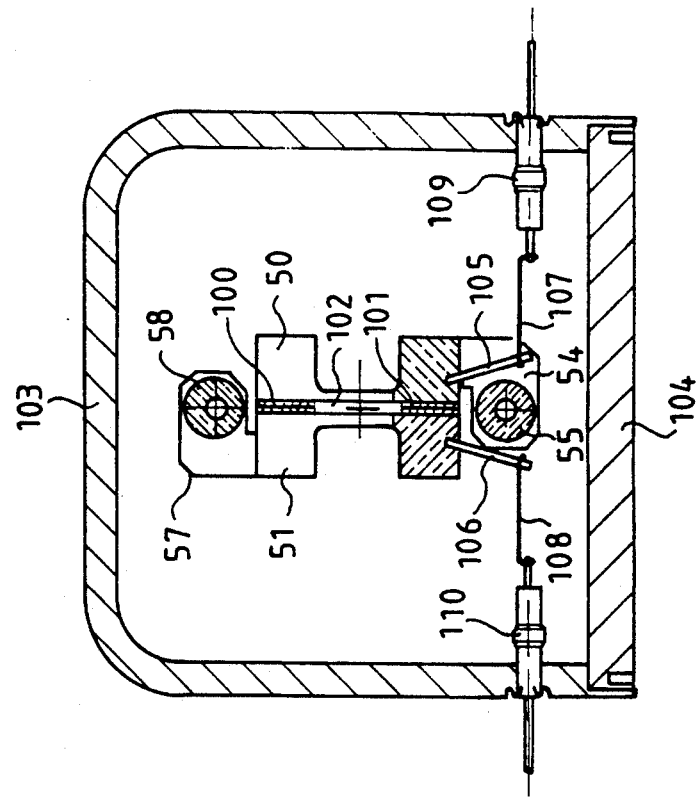
FIG. 11 shows a cross-section along a line XI, XI of the undulator shown in the preceding figure.
Figure 10:
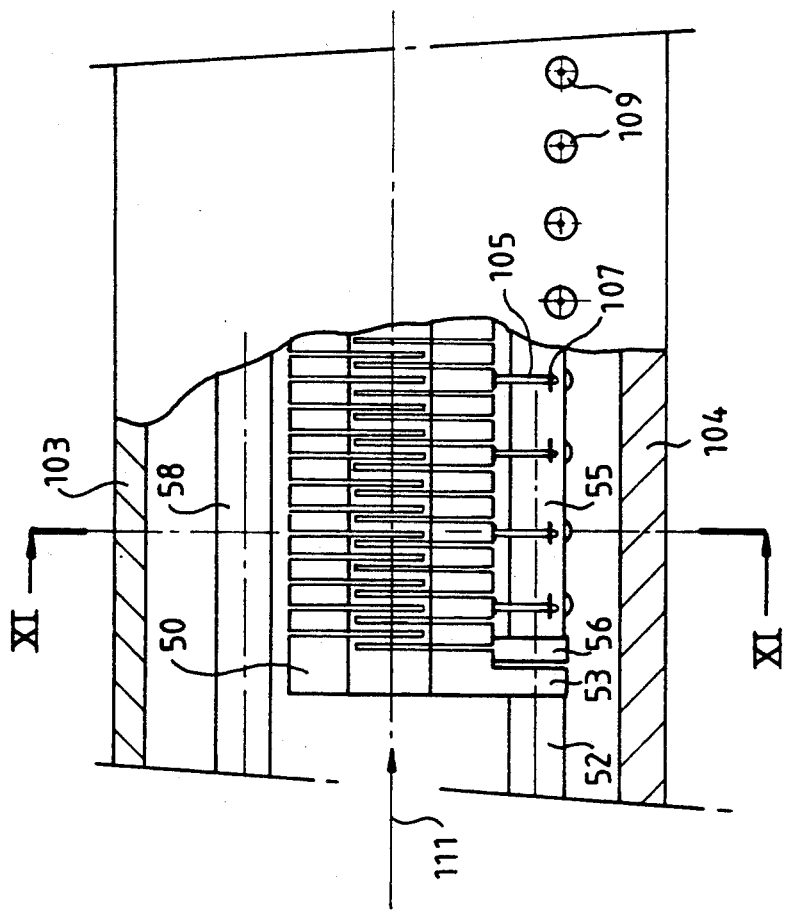
FIG. 10 shows a partial longitudinal section of an undulator according to the invention.

FIGS. 10 and 11 illustrate an embodiment of an undulator structure having a magnetization circuit formed by an undulating conductor in two superimposed parts 50, 51 assembled electrically in series as in FIG. 5 and provided with auxiliary current bypass connectors spaced out along their length.

The two superimposed parts 50, 51 of the undulating conductor are separated by insulating spacers 100, 101 so as to leave a free space 102 between them for the flow of the electron beam. They are held in position by two sets of longitudinal bars (not shown), bolted to each other. These two sets of longitudinal bars grip the parts 50, 51 by the side in resting on the insulating spacers 100, 101.

On each side of the two parts 50, 51 of the undulating conductor can be seen the conductive lead-in bar 52 for the main current $I_o$ fixed to the lateral shoulder 53 coming from the part 50, the electrical interconnection conductive bar 55 which is in the extension of the current lead-in conductive bar 52 and is fixed between the lateral shoulder 54 coming from the part 50 and the lateral shoulder 56 coming from the part 51, and the current outgoing conductive bar 58 positioned on the other side of the parts 50 and 51, and fixed to the lateral shoulder 57 coming from the part 51.

The assembly formed by the two parts 50, 51 of the undulating conductor, their holding and interconnection bars 52, 55, 58 as well as the system of cooling tubes (not shown so as not to burden the figures) is positioned in a vacuum case having a U-shaped section 103 closed at its base by a pedestal 104 and at its ends by lids.

Figure 4D:
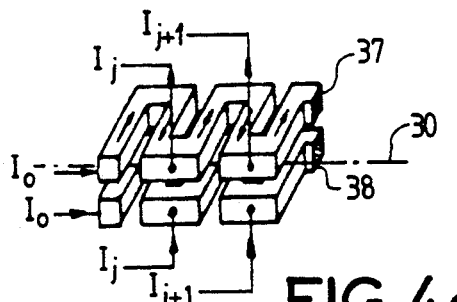
Figure 4E:
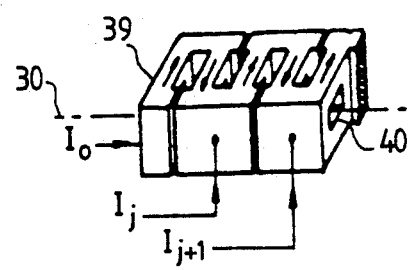
Figure 4F:
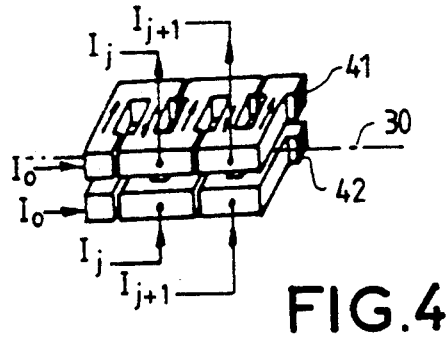
Figure 4G:
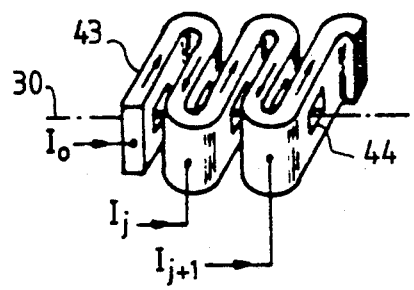
Figure 4H:
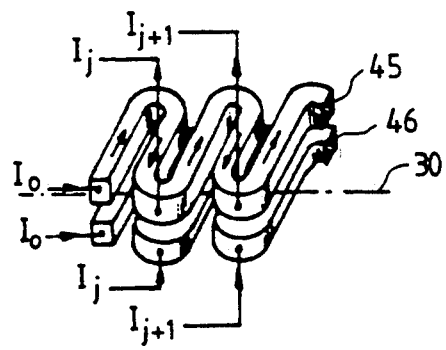

The two parts 50 and 51 of the undulating conductor which form undulations with U-shaped rectangular contours as shown in FIG. 4d, have electrical current bypass connectors along one of their sides facing the bottom of the vacuum case. These connectors are spaced out at intervals of every three undulations. These bypass connectors are each constituted by a piece of metallic rod 105, 106, planted laterally in the parts 50, 51 of the undulating conductor and connected by a connection wire 107, 108 to an imperviously sealed, insulating electrical bushing 109, 110 fixed in the vicinity, through the wall 103 of the vacuum case.

It is noted that the electrical bypass connectors on the parts 50, 51 of the undulating conductor are placed symmetrically in relation to the interposed plane which is located between the two parts 50, 51 of the undulating conductor and in which there flows the electron beam in the direction of the arrow 111.

What is claimed is:

1. A method for modulating an undulator transverse magnetic field for generating light energy from an electron beam emitted in bursts, the duration of a burst being one macropulse, the method comprising the steps:
    providing an undulating conductive path along an electron beam for conducting main excitation current therealong;
    providing spaced connection points along the undulating conductive path;
    injecting a main excitation current into the undulator for flow along its entire length thereby inducing the transverse magnetic field during the macropulse;
    injecting parallel auxiliary currents at respective spaced connection points at the beginning of each macropulse;
    adding the parallel auxiliary currents to the main excitation current for combined flow in the undulating conductive path, in a direction opposite to beam travel, thereby supplementing the transverse magnetic field induced by the main excitation current.

2. The method set forth in claim 1 wherein the auxiliary currents are maintained at a constant value during a first interval of the macropulse, the currents decaying during a second interval of the macropulse.

3. The method according to claim 1 wherein the first interval is in the order of microseconds.

4. The method according to claim 1 wherein the second interval is in the order of microseconds.

5. An undulator for modulating a transverse magnetic field for generating light energy from an electron beam emitted in bursts, the undulator comprising:
    an undulating conductive path along an electron beam for conducting main excitation current therealong;
    spaced points connected along the undulating conductive path for injecting parallel auxiliary currents at respective, spaced connection points at the beginning of a macropulse;
    means for injecting main excitation current for flow along the length of the conductive path thereby inducing the transverse magnetic field for the period of time during which bursts of electrons pass through the undulator; and
    means connected to the spaced connection points for injecting the parallel auxiliary currents during the period of time when electron bursts pass through the undulator; and
    means for adding the parallel auxiliary currents to the main excitation current for combined flow in the undulating conductive path in a direction opposite to beam travel, thereby supplementing the transverse magnetic field induced by the main excitation current.

6. The undulator set forth in claim 5 wherein the means for injecting the auxiliary currents comprise switching means for interrupting auxiliary current injection thereby causing the decay thereof at a preselected time after each electron burst begins to pass through the undulator.

7. The undulator set forth in claim 5 wherein the undulating conductive path comprises two parallel spaced conductive members between which the beam passes, the spaced connection points existing on both members and spaced equi-distant from the beam.

* * * * *